United States Patent [19]

Chernotsky et al.

[11] Patent Number: 4,476,425
[45] Date of Patent: Oct. 9, 1984

[54] BATTERY CHARGER

[76] Inventors: Alan Chernotsky, 36 Lake Shore Dr., Rockaway, N.J. 07866; Richard Satz, 20 Cedar La., Succasunna, N.J. 07876

[21] Appl. No.: 406,113

[22] Filed: Aug. 6, 1982

[51] Int. Cl.³ .............................................. H02J 7/04
[52] U.S. Cl. .................................................... 320/39
[58] Field of Search .................... 320/2, 9, 32, 31, 33, 320/34, 39, 40, DIG. 2; 323/217, 282; 340/649, 650, 652; 361/50

[56] References Cited

U.S. PATENT DOCUMENTS

| | | | |
|---|---|---|---|
| 2,979,607 | 4/1961 | Herzfeld | 320/4 X |
| 3,781,631 | 12/1973 | Nelson et al. | 320/DIG. 2 X |
| 3,987,354 | 10/1976 | Mason | 320/39 |
| 4,011,483 | 3/1977 | Meadows | 340/652 X |
| 4,031,451 | 6/1977 | Gordon | 320/DIG. 2 X |
| 4,368,498 | 1/1983 | Neuhouser | 340/649 X |
| 4,395,672 | 7/1983 | Gassaway | 320/31 |

Primary Examiner—William M. Shoop
Attorney, Agent, or Firm—Lerner, David, Littenberg, Krumholz & Mentlik

[57] ABSTRACT

A battery charger can charge a battery from a primary power source having a peak voltage exceeding the maximum battery voltage independently producible by the battery. The charger has output terminals, a switch and a feedback circuit. The output terminals are adapted for connection to the battery. The switch can periodically couple the primary power source to the output terminals to raise their voltage above the maximum battery voltage. The feedback device is responsive to the charging occuring at the terminals for limiting the current thereto by varying the duty cycle of the switch.

30 Claims, 5 Drawing Figures

BATTERY CHARGER

BACKGROUND OF THE INVENTION

The present invention relates to battery chargers and, in particular, to chargers for switching a primary power source to charge a battery.

It is known to charge an automobile battery by means of a rectifier driven by a transformer whose primary is connected to the main alternating current line. These devices rely on the limited voltage producible by the transformer to limit the peak voltage applied to the automobile battery. A disadvantage with this type of system is that the need to supply relatively low voltage and current to avoid over-charging, causes rather long charging time. Attempts to increase the secondary voltage of these types of chargers results in excessive current being applied to the battery, particularly when it is fully charged.

It is also known to use a triac to switch an alternating current signal synchronously and at a varying duty cycle. By varying this duty cycle the triac can effectively regulate the power, voltage or current delivered from a power line.

Also known are ground fault detectors which sense the leakage current being carried by a ground wire. Such leakage current through a ground wire indicates a short circuit. Detection of this leakage current is used to operate a circuit breaker and remove power.

Accordingly, there is a need for a simple, efficient and safe device for quickly charging a battery.

SUMMARY OF THE INVENTION

In accordance with the illustrative embodiment demonstrating features and advantages of the present invention, there is provided a battery charger for charging a battery from a primary power source having a peak voltage exceeding the maximum battery voltage independently producible by the battery. The charger has a pair of output terminals adapted for connection to the battery. Also included is a switch means for periodically coupling the primary power source to the output terminals to raise their voltage difference in excess of the maximum battery voltage. The charger also has feedback means responsive to the charging occurring at the terminals for limiting the current thereto by varying the duty cycle of the switch means.

In a related embodiment of the same invention, the foregoing switch means and output terminals are used together with a voltage threshold means. This voltage threshold means is responsive to the voltage of the terminals for disabling the switch means to prevent charging, in response to the voltage of the terminals being less than a predetermined magnitude.

In another related embodiment of the same invention the primary power source has a high, neutral and ground line and has between the first and the latter two lines a peak voltage exceeding the maximum battery voltage independently producible by the battery. In this embodiment the battery charger has the foregoing switch means and output terminals together with a safety means. The safety means is coupled to the power source and is operable to disable the switch means and prevent charging in response to the magnitude of voltage between the ground and neutral line exceeding a predetermined safety limit.

Battery chargers according to the foregoing principles can operate very efficiently. The preferred charger uses a silicon controlled rectifier (thyristor) to directly and periodically connect a battery to a source of alternating current. Since a relatively high voltage is thus applied to the battery, it is charged with a higher voltage and current than that employed in the prior art. For this reason, the duty cycle of the thyristor is regulated to prevent any excessive current. In a preferred embodiment the current flowing through the battery is monitored and used to generate a feedback signal to adjust the duty cycle of the thyristor.

It is preferable to use a safety device which determines whether the power lines have been properly connected to the battery charger. Accordingly, a preferred battery charger includes a device for detecting whether a voltage exists between the ground and neutral lines powering the charger. Voltage at the ground line can indicate either that the power lines are wired incorrectly or that the ground line has been severed by the user. In either event the battery charger is automatically disabled so that unknown voltages are not conveyed through it to the battery terminals. This disabling feature not only protects the battery but prevents shock to the user.

Another safety feature of the preferred embodiment is a voltage sensor which determines whether at least a minimum amount of voltage exists at the battery terminals. Absence of voltage at the battery terminals suggests that the battery is either shorted or absent. In either event the charger is disabled so that excessive current and voltages do not appear at the output terminals, again avoiding injury to either the battery or the operator.

An optional power supply included in the charger is energized from the battery terminals. This further assures that unless there is a minimum amount of voltage at the battery, the circuits of the battery charger requiring power cannot operate and will therefore disable the charging.

In a preferred embodiment, the charger may remain connected to the battery terminals for an indefinite period of time without injury. Overcharging is avoided by including a maximum voltage sensor. Should the battery voltage exceed a predetermined maximum, charging is interrupted until the battery voltage falls past a lower limit, indicating that further charging is required. Thus the battery will not be overcharged but will cycle at a rate depending on the battery load.

It is also preferred to employ an indicator and/or a fan powered from the battery. In the preferred embodiment the power from the battery is gated so that the fan and/or indicator operates when there is a ripple voltage on the battery. This feature not only alerts the user of the fact that the battery is being charged, but also limits the fan operation to times when the fan is needed, that is, during charging.

BRIEF DESCRIPTION OF THE DRAWINGS

The above brief description as well as other objects, features, and advantages of the present invention will be more fully appreciated by reference to the following detailed description of a presently preferred but nonetheless illustrative embodiment in accordance with the present invention when taken in conjunction with the accompanying drawings wherein.

DETAILED DESCRIPTION OF THE PREFERRED EMBODIMENT

Figures 1, 2, 3, 4, 5:
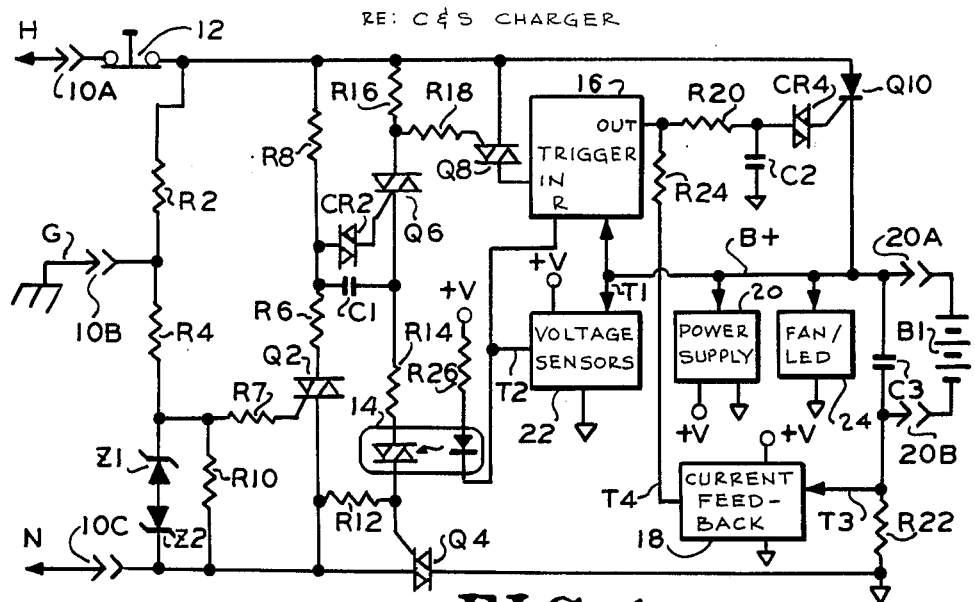
FIG. 1 is a schematic diagram, partially in block form, of a battery charger according to the principles of the present invention.
FIG. 2 is a more detailed schematic diagram of the trigger circuit of FIG. 1.
FIG. 3 is a more detailed schematic diagram of the voltage sensing means of FIG. 1.
FIG. 4 is a more detailed schematic diagram of the feedback means of FIG. 1.
FIG. 5 is a more detailed schematic diagram of the fan and light emitting diode circuit of FIG. 1.

Referring to FIG. 1, a battery charger is shown connected by means of terminals 10A, 10B and 10C to high line H, ground line G and neutral line N, respectively. Lines H, G, and N constitute a primary power source which may carry an alternating current, for example, 60 Hz at 120 volts. Serially connected with high line H is circuit breaker 12 which feeds the following serially connected devices, in this order; resistive devices R2 and R4 and zener diodes Z1 and Z2, all of which return to neutral line N. The junction of resistors R2 and R4 connect to ground line G through connector 10B. The anodes of zener diodes Z1 and Z2, are connected together, each diode having a zener voltage of 8.1 volts. Resistors R2 and R4 and zener diodes Z1 and Z2 together with the circuitry driven thereby constitute a safety means.

A semiconductor means is shown herein as triac Q2 having a pair of main lines, one connected to neutral line N through connector 10C, the other connected to one terminal of resistor R6 whose other terminal connects through resistor R8 to the junction of breaker 12 and resistor R2. The control line of triac Q2 is shown referenced to that main line of triac Q2 connecting to line N. The control line is referenced to that main line in the sense that they are drawn adjacent and in the sense that currents flowing into (out of) triac Q2 on the control line tend to allow currents to flow into (out of) the triac along the associated main line. The gate of triac Q2 is serially connected to resistor R7 which is in turn serially connected through resistor R10 and then connector 10C to line N. Resistor R10 is also connected in parallel with serially connected zener diodes Z1 and Z2.

A switching device is shown herein as triac Q4 whose main terminals connect between connector 10C and instrument ground (signified herein as a triangle to distinguish it from earth ground on line G). Unless otherwise specified, the term "ground" refers to instrument ground. The control terminal of triac Q4 connects to one terminal of resistor R12 whose other terminal connects to the associated main terminal of triac Q4 and through connector 10C to neutral line N.

Optical isolator 14 is illustrated herein as a diac that may be illuminated and controlled by a light emitting diode. With sufficient current through the light emitting diode the diac changes from a non-conductive to a conductive condition. A suitable isolator is commercially available as type number MOC 3010. The control terminal of triac Q4 connects to one diac terminal of isolator 14, the other diac terminal being serially connected through resistor R14 to one terminal of capacitor C1. The other terminal of capacitor C1 connects to the junction of resistors R6 and R8.

A first controlled semiconductor is shown herein as triac Q6. The junction of resistor 14 and capacitor C1 connects to one main line of triac Q6, its other main line being serially connected through resistor R16 to the output side of breaker 12. The control line of triac Q6, which is referenced to the main line connecting to resistor R14, is serially connected through diac CR2 to the junction of resistors R6 and R8. Diac CR2 is a device for providing a voltage threshold, that is, a predetermined voltage drop must be applied across diac CR2 before it will conduct significantly.

Still another part of the safety means is illustrated herein as second controlled semiconductor Q8. In this embodiment, semiconductor Q8 is a triac having a control line serially connected through resistor R18 to the junction of resistor R16 and triac Q6. Triac Q8 has one main line connected to the output side of breaker 12, its other main line being connected to input terminal IN of trigger circuit 16.

Trigger circuit 16 and thyristor Q10 together with its associated circuitry form a switching means which is in the nature of a transformerless semiconductor switch. Trigger circuit 16 has a terminal OUT that serially connects through resistor R20 to grounding capacitor C2. The junction of resistor R20 and capacitor C2 connects through diac CR4 to the gate electrode of thyristor Q10. The anode of thyristor Q10 connects to the output side of breaker 12, its cathode, identified herein as line B+, connects through capacitor C3 to one terminal of a ground-shunting, resistive element R22, the latter being part of a feedback means. Also part of the feedback means is feedback circuit 18 having an input terminal T3 connected to the junction of resistor R22 and capacitor C3. Circuit 18 also has an output terminal T4 connecting through resistor R24 to terminal OUT of trigger circuit 16.

Connected on either side of capacitor C3 are a pair of output terminals 20A and 20B. In the preferred embodiment connections 20A and 20B constitute a male connector fitting into the female connector of an automobile cigarette lighter. Of course, other types of connections are possible. Connected in parallel across capacitor C3 through connectors 20A and 20B is a twelve volt, automobile battery B1. The cathode of thyristor Q10, connecting to the positive terminal of battery B1, is identified herein as line B+. A power supply 20, shown energized by line B+, can produce a nominal, regulated, 3.6 volts at terminal +V, with respect to instrument ground.

Line B+ also provides an input to voltage sensing means 22, a device responsive to the magnitude of voltage on line B+ to provide a controlling voltage at its output line T2, as described in further detail hereinafter. Terminal T2 connects to terminal R of trigger circuit 16 and to the cathode of the light emitting diode of isolator 14. The anode of this diode connects through resistor R26 to terminal +V.

Line +B also connects to trigger circuit 16 and also to a ripple means, shown herein as a circuit 24. In this embodiment, circuit 24 has a fan and a light emitting diode which is described in further detail hereinafter.

Referring to FIG. 2 the trigger circuit (block 16 of FIG. 1) is shown in further detail. An optical isolator 26, identical to isolator 14, is shown having a light emitting diode whose cathode connects to terminal R and whose anode is connected through resistor R28 to line B+. The diac of isolator 26 is shown connected between terminal IN and the anode of diode CR6, whose cathode is connected through resistor R30 to the cathode of zener diode Z3 (zener voltage of 68 volts). The anode of zener diode Z3 connects to line B+. Connected in parallel across zener diode Z3 is filtering capacitor C4. Serially connected between the cathode of zener diode Z3 and the cathode of diode CR8 are serially connected resistor R32 and variable resistor R34. The anode of diode CR8 connects to line B+ and the cathode connects through resistor R36 to the anode of diode CR10, whose cathode connects to the anode of diode CR6. Capacitor C5 is connected in parallel across diode CR8, whose cathode is identified herein as terminal OUT.

Before describing the overall circuit operation the operation of the circuit of FIG. 2 will be briefly described. The circuit of FIG. 2 is basically a delay circuit, relying on the time constant between resistor R30 and capacitor C4 together with the time constant of resistors R32 and R34 and capacitor C5 to establish a delay. Assuming that a low voltage appears at terminal R, current flows through the light emitting diode of isolator 26, thereby allowing bidirectional current flow between input terminal IN and diodes CR6 and CR10. During positive half cycles of the power line, the voltage at terminal IN can be positive with respect to line B+. It will also be apparent that in the event that the switch means (thyristor Q10 of FIG. 1) conducts, the voltage between terminals IN and B+ will be approximately zero. As the voltage at terminal IN becomes positive with respect to terminal B+ at the beginning of a positive half cycle, current can flow through resistor R30 to charge capacitor C4, charging it to a reference voltage which is clamped by zener diode Z3. Once capacitor C4 is charged, its discharge current is such that it retains its charge through negative half cycles. Therefore, precise charging voltage is applied to resistors R32 and R34 to charge capacitor C5. The magnitude of this current is set by adjusting resistor R34.

When thyristor Q10 (FIG. 1) next conducts, as previously noted, the voltage at terminal IN then falls to zero volts with respect to terminal B+. This being the case, capacitor C5 quickly discharges through resistor R36 and diode CR10. However, capacitor C4 cannot discharge rapidly since it has a relatively long time constant. Diode CR8 ensures that the voltage of capacitor C5 does not reverse even in the following negative half cycle. During the next positive half cycle, capacitor C4 remains charged but capacitor C5 is recharged so that a delay interval is associated therewith.

Referring to FIG. 3 a voltage sensing means (block 22 of FIG. 1) is shown in further detail. A voltage threshold means is shown herein as operational amplifier 30 whose output is connected to the non-inverting input of operational amplifier 32. A voltage divider is shown herein as resistors R38 and R40 and serially connected between line +V and instrument ground. The junction of resistors R38 and R40 are connected to the inverting terminals of amplifiers 30 and 32. Another voltage divider, resistors R42 and R44, is serially connected between line B+ and instrument ground. A hysterisis means is shown herein as operational amplifier 34, whose inverting terminal connects to the junction of resistors R42 and R44 and the non-inverting terminal of amplifier 30. Another voltage divider, shown as resistors R46 and R48, serially connected between terminal +V and instrument ground, has its junction connected to the non-inverting terminal of amplifier 34. Resistor R50 provides positive feedback and hysterisis to amplifier 34 by being connected from its output to its non-inverting input. A pull-up resistor R52 connects between terminal +V and the outputs of amplifiers 30 and 34. The output of amplifier 32 connects to the base of NPN transistor Q12 and to one terminal of resistor R54, its other terminal connecting to line +V. The transistor Q12 has grounded emitter resistor R56 and a collector, identified as output line T2.

The operation of the circuit of FIG. 3 will be briefly described before the overall system operation is considered. Essentially, the circuit of FIG. 3 senses whether the voltage at terminal B+ satisfies certain conditions. It will be appreciated that the noninverting terminal of amplifier 34 is held at one reference voltage while the inverting terminals of amplifiers 30 and 32 are held at another reference voltage. The voltage at terminals +V is regulated at 3.6 volts, although obviously other voltages are possible. Resistors R38–R44 are chosen so that unless the voltage at line B+ exceeds 7 volts, the output of amplifier 30 is zero volts. Accordingly, amplifier 32 also produces a zero volt signal which turns transistor Q12 off, eliminating any collector current. If the voltage at terminal B+ is greater than 7 volts then amplifier 30, acting as a comparator, switches to a high state in which the output voltage of amplifier 34 can vary between high and low states. If it is initially assumed that amplifier 34 is producing a high signal, then current is applied to resistor R48 by not only resistor R46 but also through resistors R50 and R52. Accordingly, this dual current flow produces a relatively high voltage at the noninverting terminal of amplifier 34 such that the voltage at terminal B+ must exceed 14 volts before amplifier 34 is driven into a low state. When the voltage at terminal B+ does exceed 14 volts, amplifier 34 produces a low signal. This low signal causes amplifier 32 to produce a low signal keeping transistor Q12 off without regard to any signal produced by amplifier 30. In addition, the low signal from amplifier 34 eliminates current flow from terminal +V through resistors R50 and R52 into resistor R48. Instead, resistor R50 shunts resistor R48, effectively reducing current flow in resistor 48 and the voltage across it. Therefore, the voltage at terminal B+ must fall to a lesser voltage (less than 14 volts) before the state of amplifier 34 can change. In this embodiment the voltage at terminal B+ must fall to less than 11.4 volts before the output of amplifier 34 becomes high. When the output of amplifier 34 is high, and assuming the output of amplifier 30 is high as well, then amplifier 32 also produces a high signal, turning on transistor Q12 thereby allowing current to flow into its collector.

It will be appreciated that the foregoing threshold voltages described in connection with amplifier 34 describes a hysterisis effect. Assuming that the voltage of terminal B+ exceeds 11.4 volts, then transistor Q12 will only be switched in response to the voltage ascending above 14.0 volts or descending below 11.4 volts. However, when the voltage descends below 14 volts or ascends above 11.4 volts, transistor Q12 will not be switched in response thereto. It will be further appreciated that these voltages of 14 volts, 11.4 volts, and 7 volts are somewhat arbitrary and can be adjusted depending upon the application, type of battery, etc.

Referring to FIG. 4, negative feedback resistor R58 connects between the output and inverting terminal of amplifier 36. An offset voltage is provided to this inverting terminal by resistor R60 connecting between the inverting terminal and the slider of potentiometer R62. The extreme terminals of potentiometer R62 connect between terminal +V and instrument ground. The input terminal T3 connects through resistor R64 to the noninverting terminal of amplifier 36 and a ground-shunting, low pass filtering capacitor C6. The output of amplifier 36 has pull-up resistor R66 connected to terminal +V. The output of amplifier 36 also connects to the base of an NPN transistor Q14 having a grounded emitter resistor R68 and a collector resistor R70 which leads to output terminal T4.

It will be appreciated this circuit of FIG. 4 simply provides for an offset amplifier having a predetermined gain and a predetermined amount of low pass filtering from capacitor C6. Therefore the foregoing circuit is essentially linear when the signals are within the dynamic operating range of amplifier 36 and transistor Q14.

Referring to FIG. 5, a ripple means (circuit 24 of FIG. 1) is shown in further detail. Darlington transistor Q16 has its output emitter connected to instrument ground and its common collectors connected to the anode of flyback diode CR12, whose cathode connects to line B+. Connected in parallel with diode CR12 is fan motor M. Connected and parallel with motor M is the serial combination of resistor R72 and light emitting diode CR14, the latter being antiparallel with diode CR12. Capacitor C7 has one terminal connected to line B+ and its other terminal connected to the cathode of diode CR16 and the anode of diode CR18. The anode of diode CR16 is grounded. The cathode of diode CR18 connects to one terminal of capacitor C8 whose other terminal is grounded. Resistor R74 connects between the cathode of diode CR18 and the input base of Darlington transistor pair Q16.

Darlington pair Q16 is controlled and regulated by the voltage appearing at capacitor C8, the higher its voltage the more strongly Darlington pair Q16 conducts. Capacitor C7 blocks DC voltage so that only voltage fluctuations affect diodes CR16 and CR18. Negative transitions in voltage tend to induce current flow through diode CR16, with positive fluctuations through diode CR18. Accordingly, capacitor C8 tends to be positively charged to the extent that there are fluctuations in the voltage at the terminal B+. Thus, the circuit of FIG. 5 is sensitive to whether there is a ripple of voltage on line B+, the line connected directly to the positive terminal of the battery being charged. Thus motor M and light emitting diode CR14 only tend to be energized when actual charging occurs. Therefore, light emitting diode CR14 and the fan associated with motor M only operates when charging occurs.

To facilitate an understanding of the principles associated with the foregoing apparatus, its operation will be briefly described. It will be initially assumed that lines H, G and N are properly connected so that there is essentially no potential difference between connectors 10B and 10C. This being the case, the voltage on resistor R10 is zero so that triac Q2 is nonconductive without further effect. During the first positive half cycle of line H, the voltage applied to the gate of triac Q6 is sufficiently high to cause conduction. With diac 14 on, it passes current through resistors R16, R14 and R12, turning triacs Q4 and Q8 on. With triac Q4 conducting, a return current path exists so that thyristor Q10 may conduct when triggered. Since triac Q8 is conducting, the charging capacitor (capacitor C5 of FIG. 2) of trigger circuit 16 charges to a point where there is a sufficiently high voltage at terminal OUT and also at the gate of thyristor Q10 to trigger it, causing it to conduct. The manner in which trigger circuit 16 and its capacitor is then reset has already been described. Once thyristor Q10 conducts it is able to deliver a relatively high burst of current at a relatively high voltage. This inrush of current rapidly charges battery B1. The amount of current flowing through the battery is measured by feedback device 18. Feedback device 18 has a storage capacitor (capacitor C6 of FIG. 4) so that the current produced on line T4 tends to be constant, on a short term basis. Feedback device 18 provides negative feedback tending to delay the triggering of thyristor Q10 if the current flowing through resistor R22, and therefore battery B1, is excessive.

As the end of this positive half-cycle approaches, the voltage at terminal OUT of trigger circuit 16 falls and becomes 0 in the negative half-cycle. This causes capacitor C2 to eventually discharge in preparation for the succeeding positive half-cycle. However, thyristor Q10 cannot conduct during any negative half-cycle since it is a unidirectional device.

As this cyclic charging continues the periodic pumping of current into battery B1 causes a concomitant rippling in the voltage on line B+, causing the indicator and fan circuit 24 to operate and provide a visual indication of charging, together with the necessary cooling of the power handling semiconductors.

As charging continues in this fashion eventually the voltage on battery B1 exceed 14 volts. In response, voltage sensing circuit 22 produces a high signal on line T2. This simultaneously disables triac Q4 and trigger circuit 16. Triac Q4 is disabled since isolator 14 interrupts the current path to the gate of triac Q4 through resistor R14. Similarly, the high signal on line R of trigger circuit 16 interrupts current flow to terminal IN (through isolator 26 of FIG. 2). As a result, thyristor Q10 ceases conducting. Since there may be a load on battery B1, the voltage at line B+ can gradually fall, eventually reaching below 11.4 volts. In response, voltage sensor 22 produces a low signal on line T2. This re-enables triac Q4 and trigger circuit 16. Thereafter, thyristor Q10 can conduct current on positive half-cycles at a regulated duty cycle, as previously described.

It will now be assumed that an operator attempts to charge a battery that is defective in that it is shorted. After battery B1 is connected through terminals 20A and 20B, voltage sensor 22 senses that battery voltage is below 7 volts. Accordingly, a high signal is again produced on line T2 again disabling trigger circuit 16 and triac Q4. Therefore, connecting or reconnecting power on lines H, G and N produces no effect since neither triac Q4 nor thyristor Q10 can conduct. The foregoing safety disconnect is also useful under certain circumstances where the battery has been installed improperty or an improper connection has been made with the charger. It should be noted that the system is also fail-safe in that if the battery voltage is zero then both lines B+ and +V will be at zero volts so that no current can flow through the light emitting diodes in isolator 14 or in isolator 26 of FIG. 2.

It will now be assumed that the user has applied power to lines H and N but either has an improperly wired ground line G or has an open circuit at ground line G, a condition deemed unsafe. If ground line G does not exist or is at the wrong potential, a voltage will be generated across resistor R10 causing triac Q2 to conduct. Upon conducting, triac Q2 will hold the voltage at the junction of resistors R8 and R6 and at the gate of triac Q6 at a low value, rendering triac Q6 nonconductive. Therefore, there will be essentially no conduction through resistors R16, R14 and R12. Consequently, neither triac Q4 nor Q8 will conduct. Therefore there can be no return current flow into line N and thyristor Q10 cannot be triggered.

It is to be appreciated that various modifications may be implemented with respect to the above described preferred embodiment. While various triacs and thyristors are disclosed, other switching devices including relays or various transistor switches can be employed instead. Furthermore, while integrated operational amplifiers are disclosed, other embodiments may use other discrete devices or larger scale integration. Also, while the safety circuit is shown employing several triacs that operate to disable subsidiary circuits, in other embodiments a simple voltage sensor may be used to operate a relay or other switch to remove power from the charger. Furthermore, various batteries other than automobile batteries may be charged and the method of connection thereto can be altered depending upon the circumstances. Additionally, the various values and ratings of components and the voltages and currents conducted therethrough can be altered depending upon the desired power, speed, thermal stability, accuracy, etc. The following comprises a list of some of the illustrated components and their values in the preferred embodiment. However, it will be understood that the following list is merely exemplary and that other design values may be employed instead.

| R2 | 4.7 kΩ @ 0.5W | R52 | 1 kΩ |
|---|---|---|---|
| R4 | 10 kΩ | R54 | 1 kΩ |
| R6 | 2.2 kΩ | R56 | 47 Ω |
| R7 | 2.2 kΩ | R58 | 390 kΩ |
| R8 | 20 kΩ | R60 | 12 kΩ |
| R10 | 2.2 kΩ | R62 | 1 kΩ |
| R12 | 22 kΩ | R64 | 12 kΩ |
| R14 | 2.2 kΩ @ 0.5W | R66 | 10 kΩ |
| R16 | 270 Ω | R68 | 470 Ω |
| R18 | 100 Ω | R70 | 10 kΩ |
| R20 | 1.0 kΩ | R72 | 470 Ω |
| R22 | 0.01 Ω @ 2W | R74 | 2 kΩ |
| R24 | 10 kΩ | C1 | .015 μF @ 100V |
| R28 | 47 Ω | C2 | 0.1 μF @ 100V |
| R30 | 12 kΩ | C3 | 0.47 μF @ 400V |
| R32 | 39 kΩ | C4 | 0.2 μF @ 100V |
| R34 | 50 kΩ | C5 | 0.1 μF @ 100V |
| R36 | 68 kΩ | C6 | 47 μF @ 10V |
| R38 | 36 kΩ | C7 | 1.5 μF @ 50V |
| R40 | 15 kΩ | C8 | 1.5 μF @ 50V |
| R42 | 110 kΩ | C9 | 0.47 μF @ 6V |
| R44 | 18 kΩ | CR2 | Type HT 32 |
| R46 | 20 kΩ | CR4 | Type HT 32 |
| R48 | 20 kΩ | Q2, Q6, & Q8 | Type L401EX |
| R50 | 100 kΩ | Q4 | Type 4015L5 |

Obviously many modifications and variations of the present invention are possible in light of the above teachings. It is therefore to be understood that within the scope of the appended claims, the invention may be practiced otherwise than as specifically described.

What is claimed is:

1. A battery charger for charging a battery from a primary power source having a high, neutral and ground line and having between the first and the latter two lines a peak voltage exceeding the maximum battery voltage independently producible by said battery, comprising:
   output terminals adapted for connection to said battery;
   switch means for periodically coupling said primary power source to said output terminals to raise its voltage above said maximum battery voltage; and
   safety means coupled to said power source and operable to disable said switch means and prevent charging in response to the magnitude of voltage between said ground and neutral line exceeding a predetermined safety limit.

2. A battery charger according to claim 1 wherein said switch means further comprises transformerless switch means.

3. A battery charger according to claim 1 wherein said switch means takes the form of a single switching device for periodically applying power to said output terminals.

4. A battery charger according to claim 1 further comprising:
   hysterisis means coupled to said output terminals for disabling said switch means to prevent charging in response to the magnitude of voltage at said output terminals exceeding an upper limit until the magnitude of voltage at said output means descends past a lower limit.

5. A battery charger according to claim 1 further comprising:
   ripple means coupled to said output terminals for drawing power therefrom in response to fluctuations in excess of a predetermined amount occurring at said output terminals.

6. A battery charger according to claim 5 wherein said ripple means comprises:
   a fan powered from said output terminals in response to said fluctuations exceeding said predetermined amount.

7. A battery charger according to claim 1 wherein said switch means has a variable duty cycle, said battery charger further comprising feedback means responsive to charging current at said output terminals for controlling said current by varying said duty cycle.

8. A battery charger according to claim 7 wherein said battery charger further comprises power supply means for converting power available at said output terminals and supplying energy to at least said feedback means.

9. A battery charger for charging a battery from a primary power source having a peak voltage exceeding the maximum battery voltage independently producible by said battery, said primary power source including high, neutral and ground lines, there normally occurring between the first and the latter two lines said peak voltage, comprising:
   a pair of output terminals adapted for connection to said battery;
   switch means for periodically coupling said primary power source to said output terminals to raise their voltage difference in excess of said maximum battery voltage;
   feedback means responsive to the charging occurring at said terminals for limiting the current thereto by varying the duty cycle of said switch means; and
   safety means coupled to said power source and operable to disable said switch means and prevent charging in response to the magnitude of voltage between said ground and neutral lines exceeding a predetermined safety limit.

10. A battery charger according to claim 9 wherein said safety means further comprises a switching device having a control terminal and a pair of main terminals, the latter pair being serially coupled with said output terminals, the control terminal being coupled to said ground line to render said device nonconductive between its main terminals in response to said predetermined safety limit being exceeded.

11. A battery charger according to claim 10 wherein said safety means further comprises a pair of resistive devices serially coupled between said high and neutral lines, the junction of said resistive devices being coupled to said ground line.

12. A battery charger according to claim 10 wherein said safety means further comprises a semiconductor means coupled between said ground line and said switching device for rendering the latter nonconductive in response to the voltage between said ground line and neutral line exceeding said predetermined safety limit.

13. A battery charger according to claim 12 wherein said safety means further comprises:
a first controlled semiconductor having a control line and a pair of main lines, the latter pair being serially coupled between said high line and said control terminal of said switching device; and
a second controlled semiconductor having a control line and a pair of main lines, the latter pair being similarly coupled between said high line and said switch means, said control line of said second semiconductor being coupled to one of said main lines of said first semiconductor, said control line of said first semiconductor being coupled to said semiconductor means, current interruption in said first semiconductor between its main lines rendering said switching device, said second semiconductor and said switching means nonconductive.

14. A battery charger for charging a battery from a primary power source having a peak voltage exceeding the maximum battery voltage independently producible by said battery, comprising:
a pair of output terminals adapted for connection to said battery;
switch means for periodically coupling said primary power source to said output terminals to raise their voltage difference in excess of said maximum battery voltage;
feedback means responsive to the charging occurring at said terminals for limiting the current thereto by varying the duty cycle of said switch means; and
hysterisis means coupled to said output terminals for disabling said switch means to prevent charging in response to the magnitude of voltage at said output terminals exceeding an upper limit, until the magnitude of voltage of said output terminals descends past a lower limit.

15. A battery charger for charging a battery from a primary power source having a peak voltage exceeding the maximum battery voltage independently producible by said battery, comprising;
a pair of output terminals adapted for connection to said battery;
switch means for periodically coupling said primary power source to said output terminals to raise their voltage difference in excess of said maximum battery voltage;
feedback means responsive to the charging occurring at said terminals for limiting the current thereto by varying the duty cycle of said switch means; and
a power supply for converting power available at said output terminals and supplying energy to at least said feedback means.

16. A battery charger for charging a battery from a primary power source having a peak voltage exceeding the maximum battery voltage independently producible by said battery, comprising;
a pair of output terminals adapted for connection to said battery;
switch means for periodically coupling said primary power source to said output terminals to raise their voltage difference in excess of said maximum battery voltage;
feedback means responsive to the charging occurring at said terminals for limiting the current thereto by varying the duty cycle of said switch means; and
voltage sensing means responsive to the voltage of said output terminals for disabling said switch means to prevent charging of said battery when the voltage of said output terminals exceeds a predetermined upper limit, said sensing means being operable to enable said switch means in response to the voltage of said battery falling below a predetermined lower limit.

17. A battery charger for charging a battery from a primary source having a peak voltage exceeding the maximum battery voltage independently producible by said battery, comprising;
a pair of output terminals adapted for connection to said battery;
switch means for periodically coupling said primary power source to said output terminals to raise their voltage difference in excess of said maximum battery voltage;
feedback means responsive to the charging occurring at said terminals for limiting the current thereto by varying the duty cycle of said switch means; and
ripple means coupled to said output terminals for drawing power therefrom in response to fluctuations in excess of a predetermined amount occurring at said output terminals.

18. A battery charger according to claim 17 wherein said ripple means further comprises a fan powered from said output terminals in response to said fluctuations exceeding said predetermined amount.

19. A battery charger according to claims 1, 14, 15, or 18 further comprising voltage threshold means responsive to the voltage of said terminals for disabling said switch means to prevent charging in response to the voltage of said terminals being less than a predetermined magnitude.

20. A battery charger according to claims 1, 9, 14, 15, 16, 17, or 8 wherein said output terminals are adapted for connection to an automobile cigarette lighter receptacle.

21. Apparatus for charging a battery from a primary power source having a peak voltage exceeding the maximum battery voltage independently producible by said battery, comprising:
input means for coupling said apparatus to said power source;
output means for coupling said apparatus to said battery, a charging current being detectable at said output means during said charging;
switch means for periodically applying power from said input means to said output means to raise the voltage at said output means in excess of said maximum battery voltage, said switch means having a variable duty cycle;
means responsive to said charging current for controlling said current by varying said duty cycle; and hysterisis means coupled to said output means for disabling said switch means to prevent charging in response to the magnitude of voltage at said output means exceeding an upper limit until the magnitude of voltage at said output means descends past a lower limit.

22. Apparatus for charging a battery from a primary power source having a peak voltage exceeding the maximum battery voltage independently producible by said battery, comprising:

input means for coupling said apparatus to said power source;

output means for coupling said apparatus to said battery, a charging current being detectable at said output means during said charging;

switch means operative when triggered for applying power from said input means to said output means to raise the voltage at said output means in excess of said maximum battery voltage, said switch means having a variable duty cycle and taking the form of a single switch device for periodically applying power from said input means to said output means;

transformerless trigger means, said trigger means periodically triggering said switch means to apply said power from said input means to said output means;

control means responsive to said charging current for controlling said charging current by varying said duty cycle; and hysterisis means coupled to said output means for disabling said switch means to prevent charging in response to the magnitude of voltage at said output means exceeding an upper limit until the magnitude of voltage at said output means descends past a lower limit.

23. Apparatus according to claim 22 further comprising voltage threshold means responsive to the voltage of said output means for disabling said switch means to prevent charging in response to the voltage of said output means being less than a predetermined magnitude.

24. Apparatus in accordance with claim 23 further comprising ripple means coupled to said output means for drawing power therefrom in response to fluctuations in excess of a predetermined amount occurring at said output means.

25. Apparatus in accordance with claim 24 wherein said ripple means further comprise a fan powered from said output means in response to said fluctuations exceeding said predetermined amount.

26. Apparatus in accordance with claim 25 further comprising an internal power supply for providing voltage to at least said feedback means, said internal power supply receiving power from said output means.

27. Apparatus in accordance with claim 26 wherein said output means further comprises means for connection to an automobile battery.

28. Apparatus in accordance with claims 21 or 27 wherein said output means further comprises means for connection to an automobile cigarette lighter receptacle.

29. Apparatus for charging a battery from a primary power source having a peak voltage exceeding the maximum battery voltage independently producible by said battery, comprising:

input means for coupling said apparatus to said power source;

output means for coupling said apparatus to said battery, a charging current being detectable at said output means during said charging, said output means further comprising means for connection to an automobile cigarette lighter receptacle;

switch means operative when triggered for applying power from said input means to said output means to raise the voltage at said output means in excess of said maximum battery voltage, said switch means having a variable duty cycle;

transformerless trigger means, said trigger means periodically triggering said switch means to apply said power from said input means to said output means; and control means responsive to said charging current for controlling said charging current by varying said duty cycle.

30. Apparatus for charging a battery from a primary power source having a peak voltage exceeding the maximum battery voltage independently producible by said battery, comprising:

input means for coupling said apparatus to said power source;

output means for coupling said apparatus to said battery, a charging current being detectable at said output means during said charging, said output means further comprising means for connection to an automobile cigarette lighter receptacle;

switch means for periodically applying power from said input means to said output means to raise the voltage at said output means in excess of said maximum battery voltage, said switch means having a variable duty cycle, said switch means further comprising a single solid state switch device; and means responsive to said charging current for controlling said charging current by varying said duty cycle.

* * * * *

UNITED STATES PATENT AND TRADEMARK OFFICE
CERTIFICATE OF CORRECTION

PATENT NO. : 4,476,425
DATED : October 9, 1984
INVENTOR(S) : Chernotsky et al.

It is certified that error appears in the above-identified patent and that said Letters Patent are hereby corrected as shown below:

Column 12, line 49, "17" should read --18--.

Signed and Sealed this

Twenty-first Day of May 1985

[SEAL]

Attest:

DONALD J. QUIGG

Attesting Officer

Acting Commissioner of Patents and Trademarks